United States Patent
Hou et al.

(10) Patent No.: US 8,131,988 B2
(45) Date of Patent: Mar. 6, 2012

(54) SECURE BOOT DEVICE

(75) Inventors: Ren-Ting Hou, Hsichih (TW);
Chung-Li Lai, Hsichih (TW)

(73) Assignee: Wistron Corporation, Taipei, Taiwan (CN)

(*) Notice: Subject to any disclaimer, the term of this patent is extended or adjusted under 35 U.S.C. 154(b) by 562 days.

(21) Appl. No.: 12/362,606

(22) Filed: Jan. 30, 2009

(65) Prior Publication Data

US 2009/0287919 A1 Nov. 19, 2009

(30) Foreign Application Priority Data

May 15, 2008 (TW) .............................. 97117839 A

(51) Int. Cl.
*G06F 9/00* (2006.01)
*G06F 12/14* (2006.01)

(52) U.S. Cl. .............................. 713/2; 713/189; 713/192
(58) Field of Classification Search ........................ 713/2
See application file for complete search history.

(56) References Cited

U.S. PATENT DOCUMENTS

| 6,469,573 | B2* | 10/2002 | Kanda et al. ................... 327/541 |
| 7,478,246 | B2* | 1/2009 | Arndt et al. .................... 713/189 |
| 7,590,837 | B2* | 9/2009 | Bhansali et al. ................... 713/2 |
| 7,624,283 | B2* | 11/2009 | Bade et al. ..................... 713/189 |
| 7,987,374 | B2* | 7/2011 | Xie ............................. 713/192 |
| 2005/0235141 | A1* | 10/2005 | Ibrahim et al. ................ 713/164 |
| 2011/0093693 | A1* | 4/2011 | Ibrahim et al. .................... 713/2 |

* cited by examiner

*Primary Examiner* — Suresh Suryawanshi
(74) *Attorney, Agent, or Firm* — Curatolo Sidoti Co., LPA; Joseph G. Curatolo; Julie D. Hawk

(57) ABSTRACT

An electronic device includes a power supply unit, a control unit, a first boot circuit, and a data encryption unit. The control unit outputs a boot signal for causing the power supply unit to start supplying power. The first boot circuit interconnects the power supply unit and the control unit for transmitting the boot signal. The data encryption unit is for interconnecting the power supply unit and the control unit so as to form a second boot circuit through which the boot signal is transmitted and for cutting off the first boot circuit.

10 Claims, 2 Drawing Sheets

SECURE BOOT DEVICE

CROSS-REFERENCE TO RELATED APPLICATION

This application claims priority of Taiwanese application no. 097117839, filed on May 15, 2008.

BACKGROUND OF THE INVENTION

1. Field of the Invention

This invention relates to an electronic device, more particularly to an electronic device capable of preventing electronic data theft.

2. Description of the Related Art

Risk of computer data leaks is rising due to an increasing number of Trojan horse programs and increasing ingenuity of hacker intrusions. In view of this, software and hardware manufacturers, through a joint effort, have popularized a technical specification for information security protection known as a Trusted Platform Module (TPM).

In notebook computers, the TPM specification is commonly implemented as an internal chip. However, to meet consumer needs, the TPM specification can also be implemented as a removable daughter card for a personal computer, known as a TPM daughter card. The consumer in need of TPM function to protect electronic information can therefore choose to purchase separately the TPM daughter card, while a consumer not in need of the TPM function is spared an unnecessary cost.

The above-described TPM daughter card effectively supports the TPM function, protecting electronic data from being read by the Trojan horse program or the hacker. However, if the computer is stolen, a thief only needs to open a case of the computer and apply force to remove the TPM daughter card. As a result, the computer promptly loses protection provided by the TPM daughter card, exposing proprietary information to misuse.

In order to prevent data leakage resulting from loss of the TPM daughter card, software can be configured to prevent access to the electronic data on detecting removal of the TPM daughter card, or a locking mechanism for locking the TPM daughter card to a motherboard can be created. However, software is easily bypassed, and however secure the locking mechanism, it is always possible to apply a greater force to remove or destroy the TPM daughter card. It would thus still be possible to circumvent the electronic data protection provided by the TPM daughter card. Moreover, implementing the locking mechanism for protecting the TPM daughter card increases the cost of the motherboard.

SUMMARY OF THE INVENTION

Therefore, an object of the invention is to provide an electronic device capable of preventing leakage of electronic data due to removal of a data encryption unit from a motherboard.

According to this invention, an electronic device comprises a power supply unit, a control unit, a first boot circuit, and a data encryption unit. The control unit outputs a boot signal for causing the power supply unit to start supplying power. The first boot circuit interconnects the power supply unit and the control unit for transmitting the boot signal. The data encryption unit is for interconnecting the power supply unit and the control unit so as to form a second boot circuit through which the boot signal is transmitted, and for cutting off the first boot circuit.

In an embodiment of the invention, the first boot circuit is provided with a safety fuse, the electronic device further comprises a voltage source, and the data encryption unit is connected to the voltage source. When the data encryption unit interconnects the power supply unit and the control unit, the voltage source is grounded via the safety fuse, causing the safety fuse to overheat and burnout, thereby cutting off the first boot circuit.

When the data encryption unit of the electronic device is removed subsequent to being utilized to interconnect the power supply unit and the control unit and to cut off the first boot circuit, the second boot circuit is cutoff. Transmission of the boot signal from the control unit to the power supply unit is then no longer possible, and consequently, the power supply unit does not supply power necessary to boot the electronic device. Theft of electronic data through removal of the data encryption unit is thus averted.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
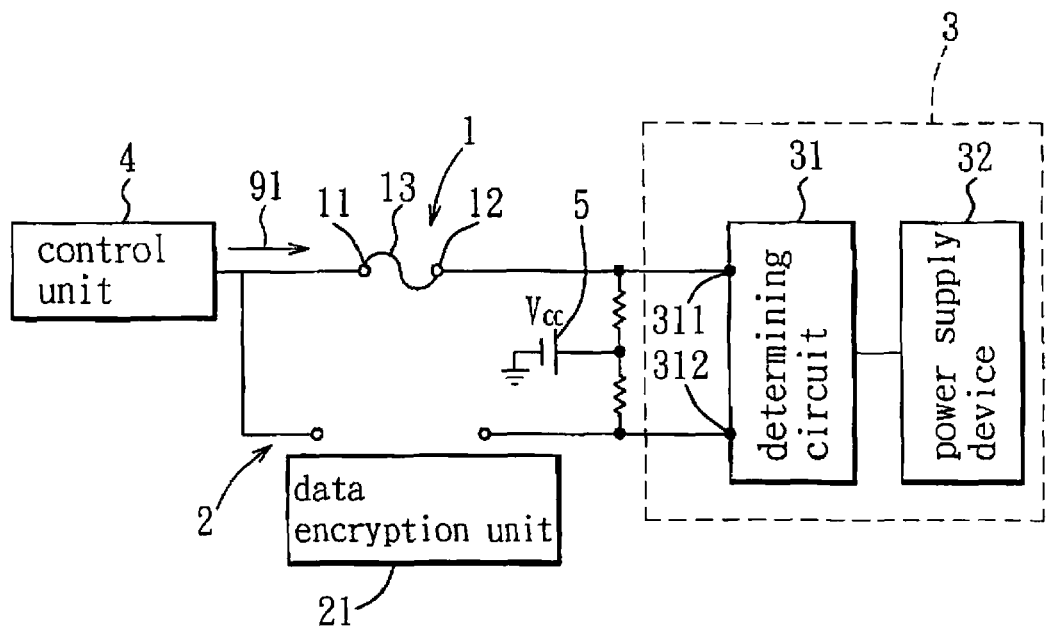
FIG. 1 is a schematic circuit block diagram of an embodiment of an electronic device according to the invention, showing transmission of a boot signal through a first boot circuit prior to installation of a data encryption unit in the electronic device.
Figure 2:
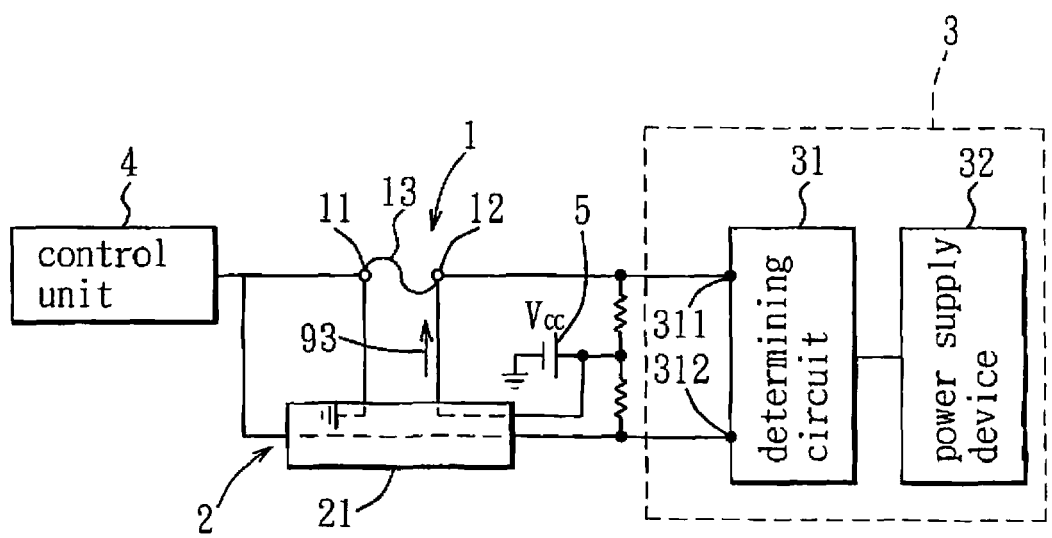
FIG. 2 is a schematic circuit block diagram of an embodiment of the invention, showing the data encryption unit installed in the electronic device, and an electrical current flow to ground via a safety fuse of the first boot circuit.

FIGS. 1 and 2 illustrate an embodiment of an electronic device according to the invention. In this embodiment, the electronic device is a computer capable of storing electronic information, and comprises a power supply unit 3, a control unit 4, a first boot circuit 1, a standby voltage source 5, and a data encryption unit 21.

In this embodiment, the control unit 4 is a Southbridge chip that outputs a boot signal for causing the power supply unit 3 to start supplying power. However, the control unit 4 can be any component capable of outputting a boot signal for causing the power supply unit 3 to supply power, such as a Baseboard Management Controller (BMC). In this embodiment, a voltage of the boot signal is at a first potential, which is a low voltage potential.

The power supply unit 3 includes a power supply device 32 and a determining circuit 31. The determining circuit 31 is provided with a first input terminal 311 connected to the first boot circuit 1 and the standby voltage source 5, and a second input terminal 312 connected to the standby voltage source 5. In this embodiment, the determining circuit 31 is an AND logic gate, and outputs a signal having a low voltage potential to control the power supply device 32 to supply power to the computer.

When a boot procedure of the computer has not yet been initiated, the standby voltage source 5 applies a bias voltage to the first and second input terminals 311, 312 to cause voltages at the first and second input terminals 311, 312 to be at a second potential, which in this embodiment is a high voltage potential. The second potential at each of the first and second terminals 311, 312 causes the determining circuit 31 to output a signal having a high voltage potential to the power supply device 32 to control the power supply device 32 to cut off power to the computer.

The first boot circuit 1 interconnects the control unit 4 and the determining circuit 31 for transmitting the boot signal, and is preferably provided with a safety fuse 13 connected between nodes 11, 12. Referring to FIG. 1, when the data encryption unit 21 has yet to be installed in the computer, and the boot procedure of the computer is initiated, the boot signal output from the control unit 4 is transmitted in a direction indicated by an arrow 91 to the first input terminal 311 of the determining circuit 31 via the safety fuse 13 of the first boot circuit 1. The boot signal causes the voltage at the first input terminal 311 to change from the second potential to the first potential. The determining circuit 31 then determines that the voltages at the first and second input terminals 311, 312 are at the first and second potentials, respectively, and outputs the signal having a low voltage potential to the power supply device 32 to control the power supply device 32 to start supplying power.

In this embodiment, the data encryption unit 21 is a daughter card capable of supporting Trusted Platform Module (TPM) function. Referring to FIG. 2, when the data encryption unit 21 is installed in the computer, the data encryption unit 21 interconnects the power supply unit 3 and the control unit 4 so as to form a second boot circuit 2 through which the boot signal is transmitted, and connects to the standby voltage source 5 and the nodes 11, 12 of the first boot circuit 1 so as to form a ground circuit as shown in FIG. 2. The ground circuit permits flow of electrical current from the standby voltage source 5 in a direction indicated by an arrow 93 through the safety fuse 13 and the data encryption unit 21 to ground. Consequently, the safety fuse 13 overheats and burns out, thereby cutting off the first boot circuit 1.

Figure 3:
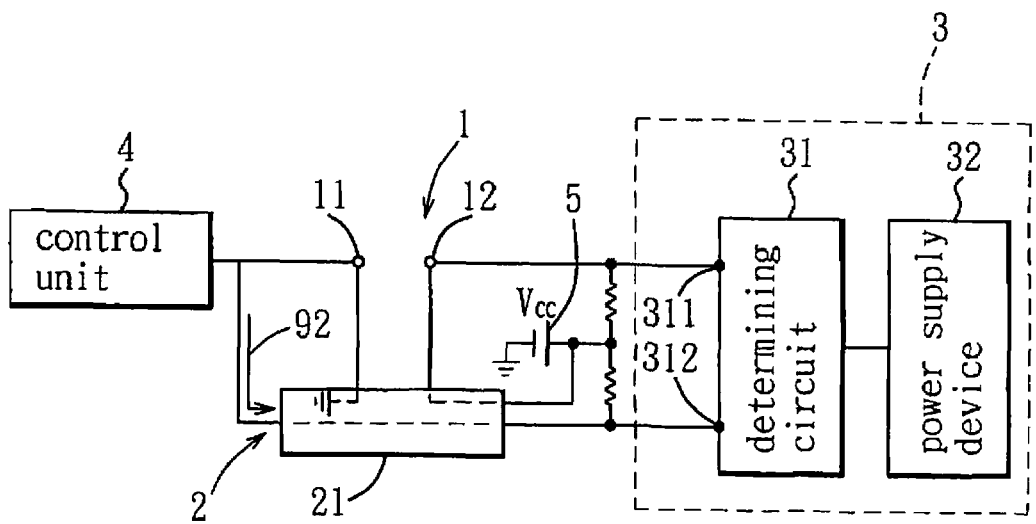
FIG. 3 is a schematic circuit block diagram of an embodiment of the invention, showing transmission of the boot signal through a second boot circuit after installation of the data encryption unit, and the first boot circuit cut off.

Referring to FIG. 3, when the boot procedure of the computer is initiated after the data encryption unit 21 has been installed and the first boot circuit 1 has been cut off, the boot signal output from the control unit 4 is transmitted in a direction indicated by an arrow 92 to the second input terminal 312 of the determining circuit 31 via the second boot circuit 2. The boot signal causes the voltage at the second input terminal 312 to change from the second potential to the first potential. The standby voltage source 5 causes the voltage at the first input terminal 311 to be at the second potential. The determining circuit 31 then determines that the voltages at the first and second input terminals 311, 312 are at the second and first potentials, respectively, and outputs the signal having a low voltage potential to the power supply device 32 to control the power supply device 32 to start supplying power.

It should be noted that the data encryption unit 21 can be realized as an external device such as an external circuit board, instead of the daughter card.

Figure 4:
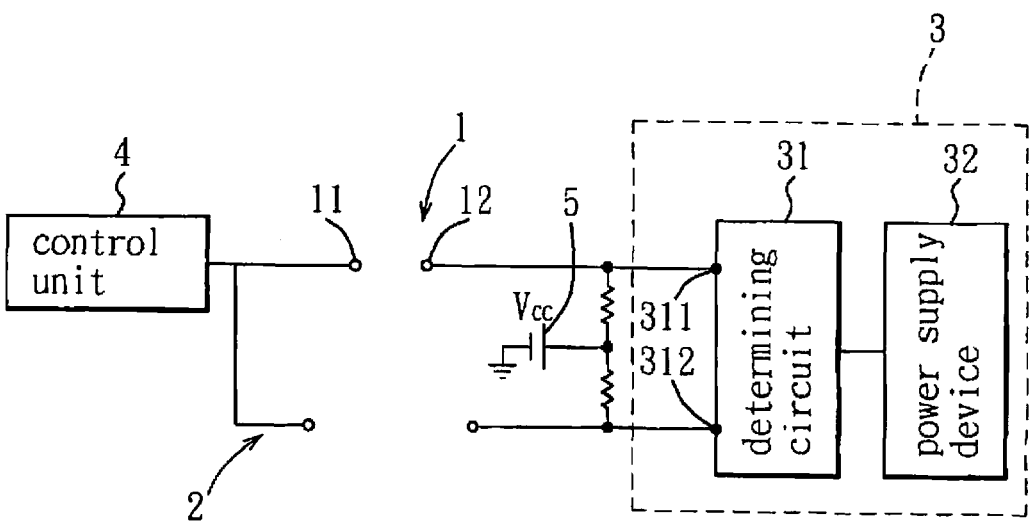
FIG. 4 is a schematic circuit block diagram of an embodiment of the invention, showing the first and second boot circuits cut off after removal of the data encryption unit.

If the computer is stolen, the TPM function of the data encryption unit 21 prevents the electronic data stored within the computer from being read. If the data encryption unit 21 is forcibly removed in anticipation that the electronic data will then become accessible after a reboot, the second boot circuit 2 is cut off. Since both the first and second boot circuits 1, 2 are cut off as shown in FIG. 4, the boot signal cannot be transmitted from the control unit 4 to the power supply unit 3. The standby voltage source 5, through application of the bias voltage to the first and second input terminals 311, 312 of the determining circuit 31, maintains the voltages of the first and second input terminals 311, 312 at the second potential, which causes the determining circuit 31 to output the signal having a high voltage potential to the power supply device 32 to control the power supply device 32 to stop supplying power. The computer thus fails to boot.

In sum, when the data encryption unit 21 of the electronic device is removed subsequent to being utilized to interconnect the power supply unit 3 and the control unit 4 and to cut off the first boot circuit 1, the second boot circuit 2 is cut off. Transmission of the boot signal from the control unit 4 to the power supply unit 3 is then no longer possible, and consequently, the power supply unit 3 does not supply power necessary to boot the electronic device. Theft of electronic data through removal of the data encryption unit 21 is thus averted.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device, comprising:
    a power supply unit;
    a control unit that outputs a boot signal for causing said power supply unit to start supplying power;
    a first boot circuit that interconnects said power supply unit and said control unit for transmitting said boot signal; and
    a data encryption unit for interconnecting said power supply unit and said control unit so as to form a second boot circuit through which said boot signal is transmitted and for cutting off said first boot circuit.

2. The electronic device as claimed in claim 1, wherein said first boot circuit is provided with a safety fuse, said electronic device further comprising a voltage source, said data encryption unit being connected to said voltage source, wherein, when said data encryption unit interconnects said power supply unit and said control unit, said voltage source is grounded via said safety fuse, causing said safety fuse to overheat and burn out, thereby cutting off said first boot circuit.

3. The electronic device as claimed in claim 2, wherein:
    said power supply unit includes a power supply device and a determining circuit, and said first boot circuit interconnects said control unit and said determining circuit;
    said determining circuit is provided with a first input terminal connected to said first boot circuit and said voltage source, and a second input terminal connected to said voltage source;
    wherein, when said data encryption unit has yet to interconnect said power supply unit and said control unit, said boot signal applies a bias voltage to said first input terminal via said first boot circuit, causing a voltage at said first input terminal to be at a first potential, and said voltage source causes a voltage at said second input terminal to be at a second potential, thereby causing said determining circuit to control said power supply device to supply power; and
    wherein, when said data encryption unit interconnects said power supply unit and said control unit, and said first boot circuit is cut off, said voltage source causes the voltage at said first input terminal to be at the second potential, and said boot signal applies a bias voltage to said second input terminal via said second boot circuit, causing the voltage at said second input terminal to be at the first potential, thereby causing said determining circuit to control said power supply device to supply power.

4. The electronic device as claimed in claim 3, wherein when said data encryption unit is removed after said first boot circuit has been cut off, said second boot circuit is cut off, and said voltage source applies a bias voltage to said second input terminal in order to change the voltage of said second input terminal to the second potential, the second potential at each of said first and second terminals causing said determining circuit to control said power supply device to stop supplying power.

5. The electronic device as claimed in claim 4, wherein said determining circuit is an AND logic gate, the first potential is a low voltage potential, and the second potential is a high voltage potential.

6. The electronic device as claimed in claim 5, wherein said electronic device is a computer capable of storing electronic data, and said data encryption unit is a daughter card capable of supporting Trusted Platform Module (TPM) function.

7. The electronic device as claimed in claim 5, wherein said electronic device is a computer capable of storing electronic data, and said data encryption unit is a circuit board capable of supporting Trusted Platform Module (TPM) function.

8. The electronic device as claimed in claim 1, wherein:

said power supply unit includes a power supply device and a determining circuit, said first boot circuit interconnects said control unit and said determining circuit, and said electronic device further comprises a voltage source;

said determining circuit is provided with a first input terminal connected to said first boot circuit and said voltage source, and a second input terminal connected to said voltage source;

wherein, when said data encryption unit has yet to interconnect said power supply unit and said control unit, said boot signal applies a bias voltage to said first input terminal via said first boot circuit, causing a voltage at said first input terminal to be at a first potential, and said voltage source causes a voltage at said second input terminal to be at a second potential, thereby causing said determining circuit to control said power supply device to supply power; and wherein, when said data encryption unit interconnects said power supply unit and said control unit, and said first boot circuit is cut off, said voltage source causes the voltage at said first input terminal to be at the second potential, and said boot signal applies a bias voltage to said second input terminal via said second boot circuit, causing the voltage at said second input terminal to be at the first potential, thereby causing said determining circuit to control said power supply device to supply power.

9. The electronic device as claimed in claim 1, wherein, said electronic device is a computer capable of storing electronic data, and said data encryption unit is a circuit board capable of supporting Trusted Platform Module function.

10. The electronic device as claimed in claim 1, wherein said electronic device is a computer capable of storing electronic data, and said data encryption unit is a daughter card capable of supporting Trusted Platform Module function.

* * * * *